United States Patent
Tanimoto et al.

(10) Patent No.: US 12,241,226 B2
(45) Date of Patent: Mar. 4, 2025

(54) IMAGE DISPLAY SYSTEM OF WORK MACHINE, REMOTE OPERATION SYSTEM OF WORK MACHINE, WORK MACHINE, AND METHOD FOR DISPLAYING IMAGE OF WORK MACHINE

(71) Applicants: Komatsu Ltd., Tokyo (JP); Osaka University, Suita (JP)

(72) Inventors: Takanobu Tanimoto, Osaka (JP); Kei Shinohara, Tokyo (JP); Hiroshi Yoshinada, Tokyo (JP)

(73) Assignees: KOMATSU LTD., Tokyo (JP); OSAKA UNIVERSITY, Osaka (JP)

( * ) Notice: Subject to any disclaimer, the term of this patent is extended or adjusted under 35 U.S.C. 154(b) by 1252 days.

(21) Appl. No.: 16/316,093

(22) PCT Filed: Aug. 24, 2017

(86) PCT No.: PCT/JP2017/030406
§ 371 (c)(1),
(2) Date: Jan. 8, 2019

(87) PCT Pub. No.: WO2018/043299
PCT Pub. Date: Mar. 8, 2018

(65) Prior Publication Data
US 2021/0285184 A1    Sep. 16, 2021

(30) Foreign Application Priority Data
Aug. 31, 2016  (JP) .................................. 2016-170343

(51) Int. Cl.
*E02F 9/16*    (2006.01)
*B60K 35/00*   (2024.01)
(Continued)

(52) U.S. Cl.
CPC ................ *E02F 9/16* (2013.01); *B60K 35/00* (2013.01); *E02F 9/264* (2013.01);
(Continued)

(58) Field of Classification Search
USPC ............................................................. 172/4
See application file for complete search history.

(56) References Cited

U.S. PATENT DOCUMENTS 5,996,702 A    12/1999 Hall
7,606,648 B2*  10/2009 Shepherd .................. E02F 9/26
                                                91/522
(Continued)

FOREIGN PATENT DOCUMENTS

CN    104470458 A    3/2015
JP    2000-116947 A   4/2000
(Continued)

OTHER PUBLICATIONS

Edwin Catmull, "A Subdivision Algorithm for Computer Display of Curved Surface", National Technical Information Service, U.S. Department of Commerce, Dec. 1974, 84 pages in total.
(Continued)

*Primary Examiner* — William L Bashore
*Assistant Examiner* — Koorosh Nehchiri
(74) *Attorney, Agent, or Firm* — Troutman Pepper Locke LLP (57) ABSTRACT

There are provided a position calculator that determines a position of working equipment included in a work machine, a display that displays a route image corresponding to a route through which the working equipment moves, and a display processor that causes, on the basis of a position of the route and a position of the working equipment determined by the position calculator, the display to display the route image corresponding to a portion of the route that is
(Continued)

shielded by the working equipment with a predetermined position serving as a viewpoint in a form different from the route image corresponding to a portion of the route that is not shielded by the working equipment.

19 Claims, 7 Drawing Sheets

(51) Int. Cl.
  *B60K 35/81* (2024.01)
  *E02F 9/26* (2006.01)
  *G02B 27/01* (2006.01)
(52) U.S. Cl.
  CPC .......... *G02B 27/0101* (2013.01); *B60K 35/81* (2024.01); *G05B 2219/45012* (2013.01)

(56) References Cited

U.S. PATENT DOCUMENTS

| | | | |
|---|---|---|---|
| 10,610,172 B2 | 4/2020 | Hummel et al. | |
| 2005/0256607 A1* | 11/2005 | Shepherd | E02F 9/26 700/213 |
| 2006/0034535 A1* | 2/2006 | Koch | H04N 5/272 382/284 |
| 2006/0178820 A1* | 8/2006 | Eglington | A01B 69/008 701/50 |
| 2012/0166024 A1* | 6/2012 | Phillips | G05D 1/0088 701/2 |
| 2013/0125042 A1* | 5/2013 | Nielsen | G06V 10/242 715/781 |
| 2013/0222573 A1* | 8/2013 | Onuma | G05B 9/02 348/82 |
| 2014/0099178 A1* | 4/2014 | Nomura | E02F 3/30 414/685 |
| 2014/0100712 A1* | 4/2014 | Nomura | E02F 9/26 701/1 |
| 2014/0100744 A1* | 4/2014 | Johnson | E02F 3/3677 701/50 |
| 2014/0184643 A1* | 7/2014 | Friend | G09G 3/003 345/633 |
| 2014/0188333 A1* | 7/2014 | Friend | E02F 9/261 701/34.4 |
| 2014/0271074 A1* | 9/2014 | Ogawa | E02F 9/264 414/687 |
| 2015/0199004 A1* | 7/2015 | Johnson | G02B 27/017 345/156 |
| 2015/0199106 A1* | 7/2015 | Johnson | G06F 3/011 715/740 |
| 2015/0201892 A1 | 7/2015 | Hummel et al. | |
| 2015/0326829 A1* | 11/2015 | Kurihara | H04N 7/181 348/148 |
| 2016/0076228 A1* | 3/2016 | Nau | E02F 9/265 701/50 |
| 2016/0193920 A1 | 7/2016 | Tsubone et al. | |
| 2016/0260261 A1* | 9/2016 | Hsu | B23K 9/0953 |
| 2016/0353049 A1* | 12/2016 | Maley | G06T 11/20 |
| 2017/0090196 A1* | 3/2017 | Hendron | G06T 19/006 |
| 2017/0255895 A1 | 9/2017 | Kozumi et al. | |
| 2018/0202130 A1* | 7/2018 | Morimoto | H04N 7/181 |
| 2018/0218538 A1* | 8/2018 | Short | G06V 20/20 |
| 2020/0026076 A1* | 1/2020 | Beckman | H04N 5/77 |
| 2021/0285184 A1* | 9/2021 | Tanimoto | E02F 9/262 |

FOREIGN PATENT DOCUMENTS

| | | |
|---|---|---|
| JP | 2002-146846 A | 5/2002 |
| JP | 2004-294067 A | 10/2004 |
| JP | 2004-348095 A | 12/2004 |
| JP | 2005-114235 A | 4/2005 |
| JP | 2006-053922 A | 2/2006 |
| JP | 2014-129676 A | 7/2014 |
| JP | 2016-061054 A | 4/2016 |
| WO | 2016/125915 A1 | 8/2016 |

OTHER PUBLICATIONS

International Search Report mailed Nov. 21, 2017, issued for PCT/JP2017/030406.

* cited by examiner

IMAGE DISPLAY SYSTEM OF WORK MACHINE, REMOTE OPERATION SYSTEM OF WORK MACHINE, WORK MACHINE, AND METHOD FOR DISPLAYING IMAGE OF WORK MACHINE

FIELD

The present invention relates to an image display system of a work machine, a remote operation system of a work machine, a work machine, and a method for displaying an image of a work machine.

BACKGROUND

As disclosed in Patent Literature 1, there has been known a technique for remotely operating a work machine such as a hydraulic excavator. Further, Patent Literature 2 discloses a technique for displaying, around working equipment, a projected image of work support information to be visually perceived by an operator in a cab by controlling a display position along a combiner surface of the work support information and a depth display position in front of the cab on the basis of position information of the working equipment.

CITATION LIST

Patent Literature

Patent Literature 1: Japanese Patent Application Laid-Open No. 2004-294067 A
Patent Literature 2: Japanese Patent Application Laid-Open No. 2014-129676 A

SUMMARY

Technical Problem

When a work machine is remotely operated, a displayed image is two-dimensional in the operation using an image of an operator viewpoint of the work machine, whereby a sense of perspective becomes poor. Therefore, it becomes difficult to grasp a distance between working equipment and a work object, which may lower a work efficiency. Further, when an operator boarded on the work machine operates the working equipment, it may be difficult to grasp the distance between the working equipment and the work object depending on a level of skill of the operator, which may lower the work efficiency. It is difficult to inform the operator of the depth on a two-dimensional screen by simply controlling the depth display position and projecting the work support information in front of the cab. As a result, the work efficiency may be lowered.

It is an object of an aspect of the present invention to suppress a decrease in work efficiency when working with a work machine including working equipment.

Solution to Problem

According to a first aspect of the present invention, an image display system of a work machine, comprises: a position calculator that determines a position of working equipment included in the work machine; a display that displays a route image corresponding to a route through which the working equipment moves; and a display processor that causes the display to display, on the basis of a position of the route and a position of the working equipment determined by the position calculator, the route image corresponding to a portion of the route that is shielded by the working equipment with a predetermined position serving as a viewpoint in a form different from the route image corresponding to a portion of the route that is not shielded by the working equipment.

According to a second aspect of the present invention, in the first aspect, wherein the display processor converts the route image into an image viewed from the predetermined position and causes the display to display the converted image.

According to a third aspect of the present invention, the image display system of a work machine according to the second aspect, further comprises: an imaging device that is attached to the work machine and images an object, wherein the display processor combines the route image and an image of the working equipment captured by the imaging device and causes the display to display the combined image.

According to a fourth aspect of the present invention, in the third aspect, wherein the predetermined position is a position of the imaging device that is attached to the work machine and images the object.

According to a fifth aspect of the present invention, in any one of the first to fourth aspects, wherein the display processor changes a display form of the route image depending on a distance between the working equipment and the route.

According to a sixth aspect of the present invention, a remote operation system of a work machine, comprises: the image display system of a work machine according to any one of the first to fifth aspects; and an operation device that operates the working equipment.

According to a seventh aspect of the present invention, a work machine comprises: the image display system of a work machine according to any one of the first to fifth aspects.

According to an eighth aspect of the present invention, a method for displaying an image of a work machine, comprises: determining a position of working equipment of the work machine; determining, on the basis of a position of a route through which the working equipment moves and a position of the working equipment, whether the working equipment shields the route with a predetermined position serving as a viewpoint; and causing a display to display a route image corresponding to a portion of the route that is shielded by the working equipment in a form different from the route image corresponding to a portion of the route that is not shielded by the working equipment.

Advantageous Effects of Invention

According to an aspect of the present invention, a decrease in work efficiency can be suppressed when working with a work machine including working equipment.

DESCRIPTION OF EMBODIMENTS

Modes (embodiments) for carrying out the present invention will be described in detail with reference to the accompanying drawings.

<Overview of Image Display System of Work Machine and Remote Operation System of Work Machine>

Figure 1:
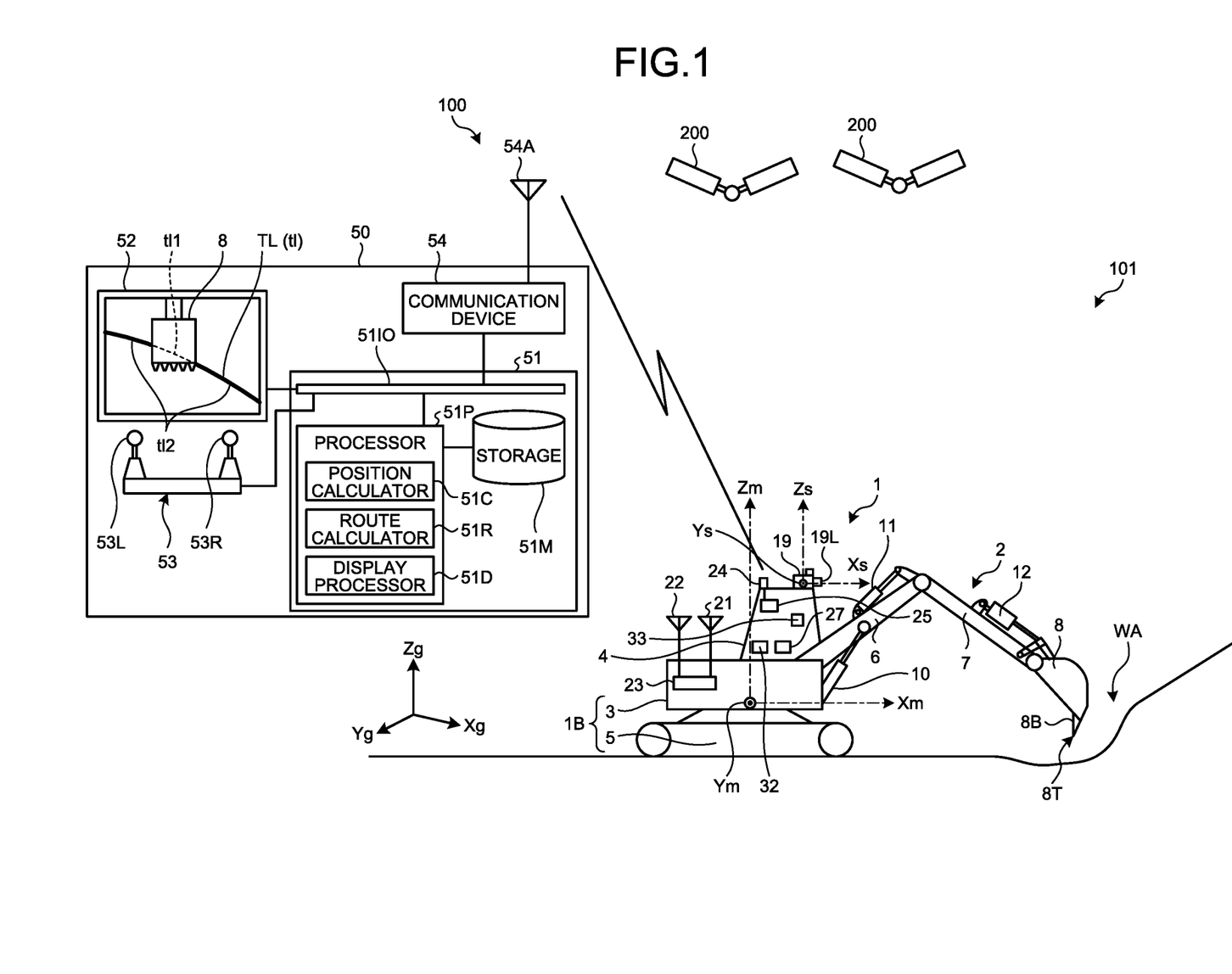
FIG. 1 is a diagram illustrating an image display system of a work machine and a remote operation system of the work machine according to an embodiment.

FIG. 1 is a diagram illustrating an image display system 100 of a work machine and a remote operation system 101 of the work machine according to an embodiment. In the image display system 100 of the work machine (hereinafter referred to as image display system 100 as appropriate), when an operator of the work machine remotely operates a hydraulic excavator 1 as an example of the work machine, a work object of the hydraulic excavator 1, which is, in more detail, a topography surface to be worked by working equipment 2 included in the hydraulic excavator 1, that is, a work object WA and a bucket 8 as a work implement, are captured by a imaging device 19, and an obtained image is displayed on a display device 52. At this time, the image display system 100 causes the display device 52 to display an image including the bucket 8 and a route image TL corresponding to a route tl through which the bucket 8 moves.

The image display system 100 includes a position calculator 51C, a route calculator 51R, the display device 52 as a display unit, and a display processor 51D. The remote operation system 101 of the work machine (hereinafter referred to as remote operation system 101 as appropriate) includes the image display system 100, and an operation device 53. In the embodiment, a position calculation device 23 in the image display system 100 is installed in the hydraulic excavator 1, and the position calculator 51C, the route calculator 51R, the display device 52, and the display processor 51D are installed in a facility 50. The facility 50 is used for remotely controlling the hydraulic excavator 1 and managing the hydraulic excavator 1.

The position calculator 51C, the route calculator 51R, and the display processor 51D in the image display system 100 are part of a processing device 51 in the facility 50. The processing device 51 includes a processor 51P, a storage 51M, and an input/output unit 51IO. The processor 51P is exemplified by a processor such as a central processing unit (CPU) and a graphical processing unit (GPU). The storage 51M is exemplified by, for example, a random access memory (RAM), a read-only memory (ROM), a hard disk drive, a storage device, or a combination thereof. The input/output unit 51IO is an interface circuit for connecting the processing device 51 and an external device. In the embodiment, the display device 52, the operation device 53, and a communication device 54 are connected to the input/output unit 51IO as external devices. The external devices to be connected to the input/output unit 51IO are not limited thereto.

The processor 51P includes the position calculator 51C, the route calculator 51R, and the display processor 51D. The position calculator 51C determines a position of the working equipment 2 of the hydraulic excavator 1. The position of the working equipment 2 includes a position of the work implement included in the working equipment 2, that is, the bucket 8 in the embodiment. The route calculator 51R determines the route tl through which the working equipment 2 moves, that is, the route tl through which the working equipment 2 will move (route tl through which the working equipment 2 is about to move). In the embodiment, the route tl through which the bucket 8, which is a part of the working equipment 2, moves is determined. However, it is not limited to the route of the bucket 8. The route tl is a target route when the bucket 8 moves. That is, the route tl serves as a guide when the operator moves the working equipment 2, thereby serving as a target index for assisting the operator.

The route tl through which the working equipment 2 moves may be, for example, a route in which the working equipment 2 does not contact an obstacle, a route of the shortest distance for movement, a route that enables the most efficient movement, or a route along a target construction surface at a field site or design information such as a design surface. In addition, the route tl through which the working equipment 2 moves may be a route at the time of swinging a hoist while lifting the working equipment 2 after the working equipment 2 excavates the object, or a route at the time of swinging the hoist while lowering the working equipment 2 after loading or waste soil discarding. In the embodiment, the center in a width direction of a cutting edge 8T of the bucket 8 is set to be a reference position of the route tl. However, it is not limited thereto, and a left end or a right end of the cutting edge 8T of the bucket 8 may be set as a reference point. Further, a position other than the cutting edge 8T of the bucket 8 may be set as a reference position of the route tl.

The display processor 51D determines a first portion tl1, which is a portion in which the route tl is shielded by the working equipment 2, on the basis of the position of the route determined by the route calculator 51R and the position of the working equipment 2 determined by the position calculator 51C with a predetermined position of the determined route tl serving as a viewpoint. The display processor 51D causes the display device 52 to display, when viewed from the predetermined position, the route image TL of the first portion tl1 in which the route tl is shielded by the working equipment 2 in a form different from the route image TL of a second portion tl2, which is a portion in which the route tl is not shielded by the working equipment 2. The working equipment 2 includes the bucket 8, an arm 7, and a boom 6 as members constituting the working equipment 2. Accordingly, when the route tl is shielded by the working equipment 2, it is considered that the route tl is shielded by the constituent members of the working equipment 2. In the embodiment, it is considered that the route tl is shielded by the working equipment 2 in both cases where the route tl is shielded by at least a part of the working equipment 2, that is, for example, the bucket 8, a blade 8B of the bucket 8, the arm 7, the boom 6, the bucket 8 and the arm 7, and the like, and where the route tl is shielded by the entire working equipment 2.

The predetermined position is exemplified by a position corresponding to a viewpoint of the operator operating the hydraulic excavator 1, and a position of the imaging device 19 attached to the hydraulic excavator 1, which captures an image of the object. The position corresponding to the viewpoint of the operator operating the hydraulic excavator 1 is exemplified by a position of eyes in a posture of the operator seated in a driver seat of the hydraulic excavator 1 to operate the hydraulic excavator 1. Further, the predetermined position is not limited to the position corresponding to the viewpoint of the operator and the position of the imaging device 19, and may be a free viewpoint unrelated to those viewpoints. The free viewpoint is exemplified by a bird's-eye viewpoint, a viewpoint of the operator placed on a virtual space, and the like.

In the embodiment, the processor 51P reads and executes a computer program for implementing functions of the position calculator 51C, the route calculator 51R, and the display processor 51D from the storage 51M, thereby implementing the functions of the position calculator 51C, the route calculator 51R, and the display processor 51D. The functions of the position calculator 51C, the route calculator 51R, and the display processor 51D may be implemented by a processing circuit. The processing circuit is dedicated hardware for implementing the functions of the position calculator 51C, the route calculator 51R, and the display processor 51D. The processing circuit corresponds to a single circuit, a composite circuit, a programmed processor, a parallel programmed processor, an application specific integrated circuit (ASIC), a field programmable gate array (FPGA), or a combination thereof.

The display device 52 displays the route tl generated by the processing device 51, and an image captured by the imaging device 19 of the hydraulic excavator 1, that is, an image including the bucket 8 in the embodiment. Although the display device 52 is exemplified by a liquid crystal display or a projector, it is not limited thereto. The communication device 54 includes an antenna 54A. The communication device 54 communicates with a communication device 25 included in the hydraulic excavator 1 to obtain information associated with the hydraulic excavator 1 and to transmit information to the hydraulic excavator 1.

The operation device 53 includes a left operation lever 53L installed on the left side of the operator, and a right operation lever 53R installed on the right side of the operator. Front, rear, right, and left movements of the left operation lever 53L and the right operation lever 53R correspond to two-axis movements. For example, operation of the right operation lever 53R in the anteroposterior direction corresponds to operation of the boom 6 of the working equipment 2 included in the hydraulic excavator 1. Operation of the right operation lever 53R in the lateral direction corresponds to operation of the bucket 8 of the working equipment 2. Operation of the left operation lever 53L in the anteroposterior direction corresponds to operation of the arm 7 of the working equipment 2. Operation of the left operation lever 53L in the lateral direction corresponds to a swing of a slewing body 3 of the hydraulic excavator 1.

Operation amounts of the left operation lever 53L and the right operation lever 53R is detected by, for example, a potentiometer, a Hall IC, and the like, and the processing device 51 generates a control signal for controlling a solenoid control valve included in a hydraulic circuit of the hydraulic excavator 1 on the basis of the detected values. This signal is transmitted to a working equipment controller 27 via the communication device 54 in the facility 50 and the communication device 25 of the hydraulic excavator 1. The working equipment controller 27 controls the working equipment 2 by controlling the solenoid control valve on the basis of the control signal. The solenoid control valve will be described later.

The processing device 51 obtains an input for at least one of the left operation lever 53L and the right operation lever 53R, and generates a command to operate at least one of the working equipment 2 and the slewing body 3. The processing device 51 transmits the generated command to the communication device 25 of the hydraulic excavator 1 via the communication device 54. The working equipment controller 27 included in the hydraulic excavator 1 obtains the command from the processing device 51 via the communication device 25, and operates at least one of the working equipment 2 and the slewing body 3 in accordance with the command.

<Hydraulic Excavator 1>

The hydraulic excavator 1 includes the communication device 25, the working equipment controller 27, a first attitude detector 32, a second attitude detector 33, the imaging device 19, antennas 21 and 22, and the position calculation device 23. The communication device 25 is connected to an antenna 24, and communicates with the communication device 54 provided in the facility 50. The working equipment controller 27 controls operation of the working equipment 2 and the slewing body 3. The first attitude detector 32 detects an attitude of the working equipment 2. The second attitude detector 33 detects an attitude of the hydraulic excavator 1. The imaging device 19 is attached to the hydraulic excavator 1 to image the working equipment 2 and image the work object WA. The antennas 21 and 22 receive radio waves from a positioning satellite 200. The position calculation device 23 determines, using the radio waves received by the antennas 21 and 22, a global position of the antennas 21 and 22, that is, a position in a global coordinate system.

The hydraulic excavator 1 includes a vehicle body 1B as a main body portion and the working equipment 2. The vehicle body 1B includes the slewing body 3 and a traveling body 5. In the hydraulic excavator 1 according to the embodiment, an internal-combustion engine such as a diesel engine is used as an engine that is a power generation device. However, the power generation device is not limited to the internal-combustion engine. The power generation device of the hydraulic excavator 1 may be, for example, what is called a hybrid device in which an internal-combustion engine, a generator motor, and a power storage device are combined. Further, the power generation device of the hydraulic excavator 1 may not include the internal-combustion engine and may be a device in which the power storage device and the generator motor are combined.

The slewing body 3 is mounted on the traveling body 5. The traveling body 5 includes a crawler belt. The working equipment 2 is attached to a lateral side of a cab 4 of the slewing body 3.

With regard to the slewing body 3, the side on which the working equipment 2 and the cab 4 are disposed is the front side, and the side on which a counterweight is disposed is the rear side. The anteroposterior direction of the slewing body 3 is an Xm axis direction. The left side facing forward is the left side of the slewing body 3, and the right side facing forward is the right side of the slewing body 3. The lateral direction of the slewing body 3 is also referred to as a width direction or a Ym axis direction. With respect to the hydraulic excavator 1 or the vehicle body 1B, the side of the traveling body 5 based on the slewing body 3 as a reference is the lower side, and the side of the slewing body 3 based on the traveling body 5 as a reference is the upper side. The superior-inferior direction of the slewing body 3 is an Zm axis direction. In a case where the hydraulic excavator 1 is placed on a horizontal plane, the lower side is in the vertical direction, that is, the side same as the action direction of the gravity, and the upper side is the side opposite to the vertical direction.

The working equipment 2 includes the boom 6, the arm 7, the bucket 8 as a work implement, a boom cylinder 10, an arm cylinder 11, and a bucket cylinder 12. The bucket 8 includes a plurality of blades 8B. The cutting edge 8T is the tip of the blade 8B. The bucket 8 is not limited to one having a plurality of blades 8B. The bucket 8 may be a tilt bucket. In addition, the working equipment 2 may be provided with, instead of the bucket 8, a rock drilling attachment or the like including a slope bucket or a rock drilling tip as a work implement.

Each of the boom cylinder 10, the arm cylinder 11, and the bucket cylinder 12 is a hydraulic cylinder driven by pressure of a working fluid discharged from a hydraulic pump. The boom cylinder 10 drives the boom 6. The arm cylinder 11 drives the arm 7. The bucket cylinder 12 drives the bucket 8.

The antennas 21 and 22, and the antenna 24 are attached to the upper part of the slewing body 3. The antennas 21 and 22 are used for detecting a position of the hydraulic excavator 1. The antennas 21 and 22 are electrically connected to the position calculation device 23 illustrated in FIG. 1.

The antennas 21 and 22 are antennas for real time kinematic-global navigation satellite systems (global navigation system: GNSS). The antennas 21 and 22 are disposed apart from each other by a certain distance along the direction in parallel with the Ym axis. The antennas 21 and 22 receive GNSS radio waves from the positioning satellite 200, and output signals corresponding to the received GNSS radio waves. The antennas 21 and 22 may be antennas for a global positioning system (GPS).

The position calculation device 23 is a position detection device that detects the position of the hydraulic excavator 1. The position calculation device 23 detects the position of the hydraulic excavator 1 using the GNSS.

Since the imaging device 19 images the work object WA illustrated in FIG. 1, it is preferable to obtain information from the widest work object WA. Therefore, the imaging device 19 is installed above the cab 4 of the slewing body 3 in the embodiment. The place where the imaging device 19 is installed is not limited to the place above the driver seat. For example, the imaging device 19 may be installed on the upper side inside the cab 4.

In the imaging device 19, an imaging surface 19L faces the front of the slewing body 3. In the embodiment, the imaging device 19 is a monocular camera including an image sensor such as a charge coupled device (CCD) image sensor and a complementary metal oxide semiconductor (CMOS) image sensor. However, it is not limited thereto.

<Coordinate System>

In the embodiment, a coordinate system of the hydraulic excavator 1 is a vehicle body coordinate system (Xm, Ym, Zm), and a coordinate system of the imaging device 19 is a imaging device coordinate system (Xs, Ys, Zs). A coordinate system of the GNSS or the GPS is a global coordinate system (Xg, Yg, Zg). The global coordinate system (Xg, Yg, Zg) is a coordinate system with an origin point fixed to the earth serving as a reference.

The vehicle body coordinate system (Xm, Ym, Zm) is a coordinate system with an origin point fixed to the vehicle body 1B, that is, the slewing body 3 in the embodiment, serving as a reference. In the embodiment, the origin point of the vehicle body coordinate system (Xm, Ym, Zm) is the center of the swing circle of the slewing body 3, for example. The center of the swing circle exists on the swing center axis of the slewing body 3. The Zm axis of the vehicle body coordinate system (Xm, Ym, Zm) is the axis to be the swing center axis of the slewing body 3. The Xm axis is an axis that extends in the anteroposterior direction of the slewing body 3 and is orthogonal to the Zm axis. The Xm axis is a reference axis in the anteroposterior direction of the slewing body 3. The Ym axis is an axis that extends in the width direction of the slewing body 3 and is orthogonal to the Zm axis and the Xm axis.

The origin point of the imaging device coordinate system (Xs, Ys, Zs) is the center of the imaging device 19, for example. The center of the imaging device 19 may be the optical center of the imaging device 19 or the center of a light receiving surface of the image sensor included in the imaging device 19. The Xs axis of the imaging device coordinate system (Xs, Ys, Zs) is an axis that passes through the optical center of the imaging device 19 and extends in the direction orthogonal to the imaging surface 19L. The Ys axis is an axis orthogonal to the Xs axis. The Zs axis is an axis orthogonal to both the Xs axis and the Ys axis.

<Control System of Hydraulic Excavator 1>

Figure 2:
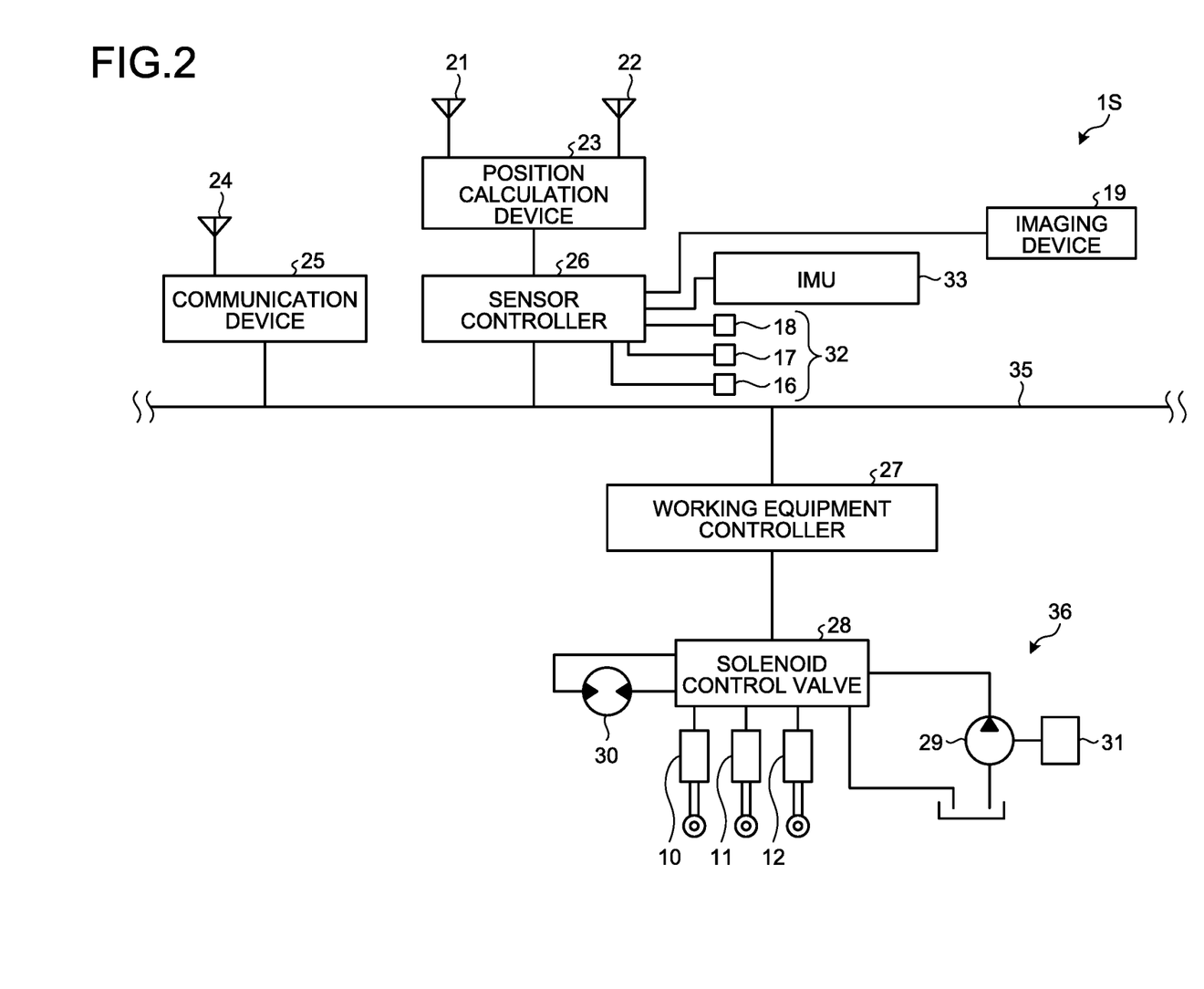
FIG. 2 is a diagram illustrating a control system of a hydraulic excavator.

FIG. 2 is a diagram illustrating a control system 1S of the hydraulic excavator 1. The control system 1S includes the communication device 25, a sensor controller 26, the working equipment controller 27, the imaging device 19, the position calculation device 23, the first attitude detector 32, the second attitude detector 33, and a hydraulic system 36. The communication device 25, the sensor controller 26, and the working equipment controller 27 are connected by a signal line 35. With such a structure, the communication device 25, the sensor controller 26, and the working equipment controller 27 can mutually exchange information via the signal line 35. The signal line that transmits information inside the control system 1S is exemplified by an in-vehicle signal line such as a controller area network (CAN).

The sensor controller 26 includes a processor such as a central processing unit (CPU), and a storage device such as a RAM and a ROM. A detection value of the position calculation device 23, information regarding an image captured by the imaging device 19, a detection value of the first attitude detector 32, and a detection value of the second attitude detector 33 are input to the sensor controller 26. The sensor controller 26 transmits, via the signal line 35 and the communication device 25, the input detection value and the image information to the processing device 51 in the facility 50 illustrated in FIG. 1.

The working equipment controller 27 includes a processor such as a central processing unit (CPU), and a storage device such as a random access memory (RAM) and a read-only memory (ROM). The working equipment controller 27 obtains, via the communication device 25, a command for operating at least one of the working equipment 2 and the slewing body 3, which is generated by the processing device 51 in the facility 50. The working equipment controller 27 controls a solenoid control valve 28 in the hydraulic system 36 on the basis of the obtained command.

The hydraulic system 36 includes the solenoid control valve 28, a hydraulic pump 29, and a hydraulic actuator such as the boom cylinder 10, the arm cylinder 11, the bucket cylinder 12, and a swing motor 30. The hydraulic pump 29 is driven by an engine 31 and discharges the working fluid for operating the hydraulic actuator. The working equipment controller 27 controls the solenoid control valve 28 to control a flow rate of the working fluid supplied to the boom cylinder 10, the arm cylinder 11, the bucket cylinder 12, and the swing motor 30. In this manner, the working equipment controller 27 controls the operation of the boom cylinder 10, the arm cylinder 11, the bucket cylinder 12, and the swing motor 30.

The sensor controller 26 obtains detection values of a first stroke sensor 16, a second stroke sensor 17, and a third stroke sensor 18. The first stroke sensor 16 is provided in the boom cylinder 10, the second stroke sensor 17 is provided in the arm cylinder 11, and the third stroke sensor 18 is provided in the bucket cylinder 12.

The first stroke sensor 16 detects a boom cylinder length, which is a length of the boom cylinder 10, and outputs it to the sensor controller 26. The second stroke sensor 17 detects an arm cylinder length, which is a length of the arm cylinder 11, and outputs it to the sensor controller 26. The third stroke sensor 18 detects a bucket cylinder length, which is a length of the bucket cylinder 12, and outputs it to the sensor controller 26.

When the boom cylinder length, the arm cylinder length, and the bucket cylinder length are determined, the attitude of the working equipment 2 is determined. The first stroke sensor 16, the second stroke sensor 17, and the third stroke sensor 18 that detect those lengths correspond to the first attitude detector 32 that detects the attitude of the working equipment 2. The first attitude detector 32 is not limited to the first stroke sensor 16, the second stroke sensor 17, and the third stroke sensor 18, and may be an angle detector.

The sensor controller 26 calculates a boom angle, which is a tilt angle of the boom 6 with respect to the direction orthogonal to the horizontal plane (Zm axis direction) in the vehicle body coordinate system as a coordinate system of the hydraulic excavator 1, on the basis of the boom cylinder length detected by the first stroke sensor 16. The sensor controller 26 calculates an arm angle, which is a tilt angle of the arm 7 with respect to the boom 6, on the basis of the arm cylinder length detected by the second stroke sensor 17. The sensor controller 26 calculates a bucket angle, which is a tilt angle of the bucket 8 with respect to the arm 7, on the basis of the bucket cylinder angle detected by the third stroke sensor 18. The tilt angles of the boom 6, the arm 7, and the bucket 8 are information indicating the attitude of the working equipment 2. In other words, the sensor controller 26 obtains the information indicating the attitude of the working equipment 2. The sensor controller 26 transmits, via the signal line 35 and the communication device 25, the calculated tilt angle to the processing device 51 in the facility 50 illustrated in FIG. 1.

The position calculation device 23 includes a processor such as a CPU, and a storage device such as a RAM and a ROM. The position calculation device 23 determines the position of the hydraulic excavator 1. Specifically, the position calculation device 23 detects and outputs, using the signal obtained from the antennas 21 and 22, positions of the antennas 21 and 22 and a bearing of the slewing body 3 in the global coordinate system (Xg, Yg, Zg). The bearing of the slewing body 3 indicates an orientation of the slewing body 3 in the global coordinate system. The orientation of the slewing body 3 may be expressed by the orientation of the slewing body 3 in the anteroposterior direction around the Zg axis of the global coordinate system, for example. A bearing angle is a rotation angle around the Zg axis of the global coordinate system of the reference axis in the anteroposterior direction of the slewing body 3. The bearing of the slewing body 3 is expressed by the bearing angle.

The second attitude detector 33 is an inertial measurement unit (IMU) in the embodiment. The second attitude detector 33 detects the operation and the attitude of the hydraulic excavator 1. Hereinafter, the second attitude detector 33 may also be referred to as an IMU 33. The operation of the hydraulic excavator 1 includes at least one of the operation of the slewing body 3 and the operation of the traveling body 5. The attitude of the hydraulic excavator 1 is expressed by a roll angle, a pitch angle, and a yaw angle of the hydraulic excavator 1. In the embodiment, the second attitude detector 33 detects and outputs an angle or an angular velocity, or an acceleration level of the hydraulic excavator 1. The angle of the hydraulic excavator 1 detected by the second attitude detector 33 is the roll angle, the pitch angle, and the yaw angle of the hydraulic excavator 1.

<Process Details Executed by Processing Device 51>

In a case where the operator of the hydraulic excavator 1 remotely operates the hydraulic excavator 1 using the operation device 53 while viewing the display device 52 of the remote operation system 101, the processing device 51 causes the display device 52 to display the route image TL as a guide serving as an index of the remote control performed by the operator. The screen of the display device 52 is a two-dimensional screen, and it is difficult to inform the operator of the depth.

Therefore, in a case where the route image TL and the image of the working equipment 2 are superimposed and displayed, the processing device 51 displays, on the display device 52, information regarding whether the route tl is shielded by the working equipment 2 when viewed from a predetermined position, that is, for example, a position corresponding to the viewpoint of the operator or a position of the imaging device 19 included in the hydraulic excavator 1. More specifically, the processing device 51 determines the first portion in which the route tl is shielded by the working equipment 2 when viewed from the predetermined position. Then, the processing device 51 causes the display device 52 to display the route image TL of the first portion in which the route tl is shielded by the working equipment 2 in a form different from the route image TL of the second portion in which the route image tl is not shielded by the working equipment 2. In the embodiment, the processing device 51 displays, when viewed from the predetermined position, the route image TL of the second portion in which the route tl is not shielded by the working equipment 2 while not displaying the route image TL of the first portion in which the route tl is shielded by the working equipment 2. Through such processing, the processing device 51 can inform the operator of the information regarding whether the working equipment 2 is located on the imaging device 19 side or the back side of the hydraulic excavator 1 than the route tl, that is, depth information, whereby a decrease in work efficiency in the remote control can be suppressed.

Figure 3:
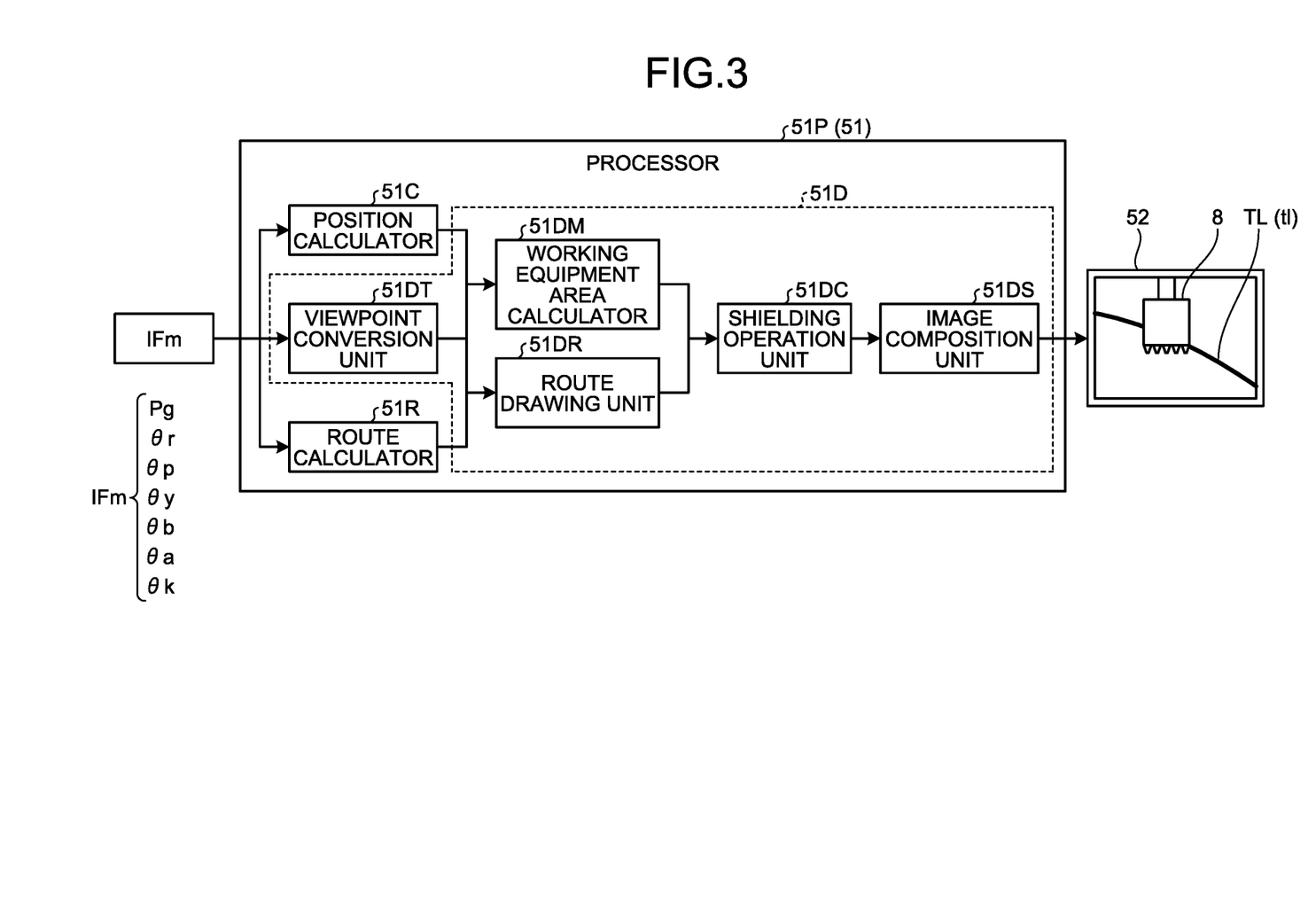
FIG. 3 is a block diagram illustrating a processor included in a processing device in the image display system.
Figure 4:
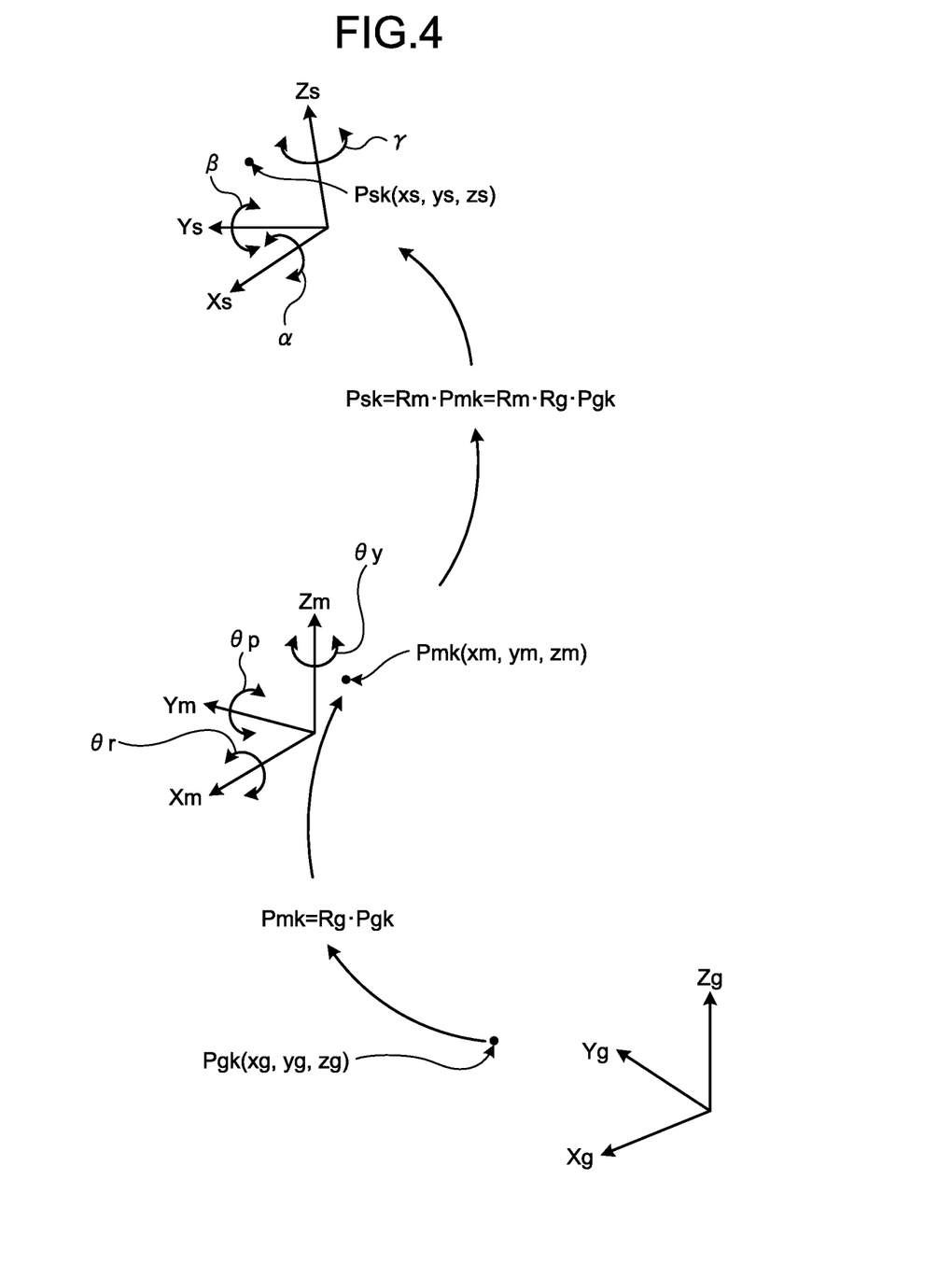
FIG. 4 is a diagram illustrating an example of converting a position in a global coordinate system into a position in an imaging device coordinate system.
Figure 5:
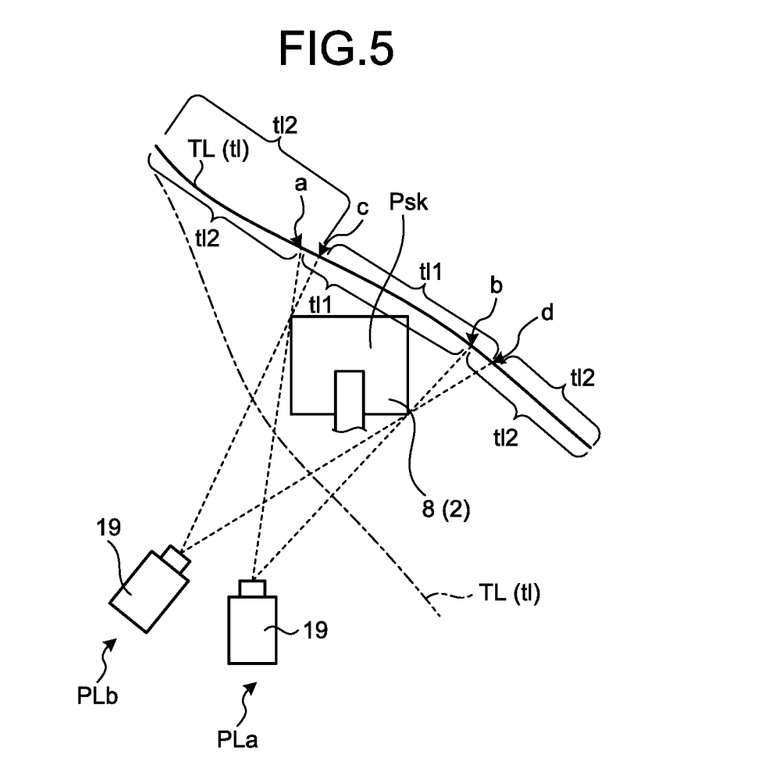
FIG. 5 is an explanatory diagram of processing for determining whether working equipment shields a route in a case where a route image is viewed from a predetermined position.
Figure 6:
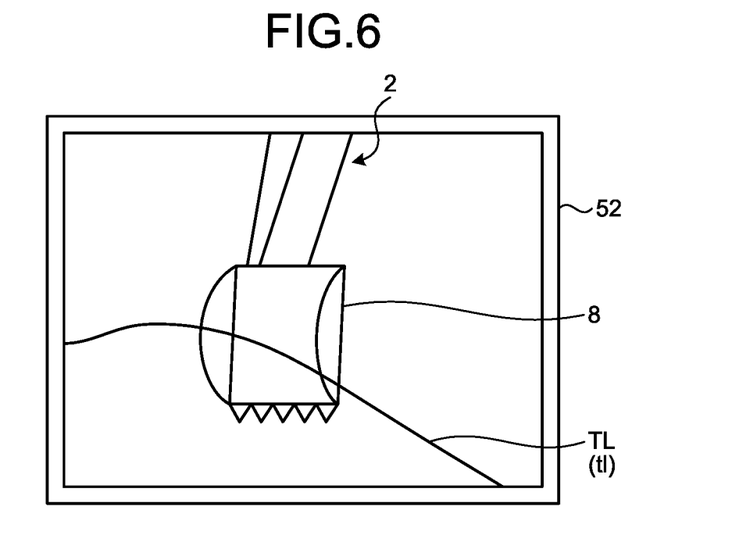
FIG. 6 is a diagram illustrating an example of a state in which the route image and a bucket of the working equipment are superimposed and displayed on a display device.
Figure 7:
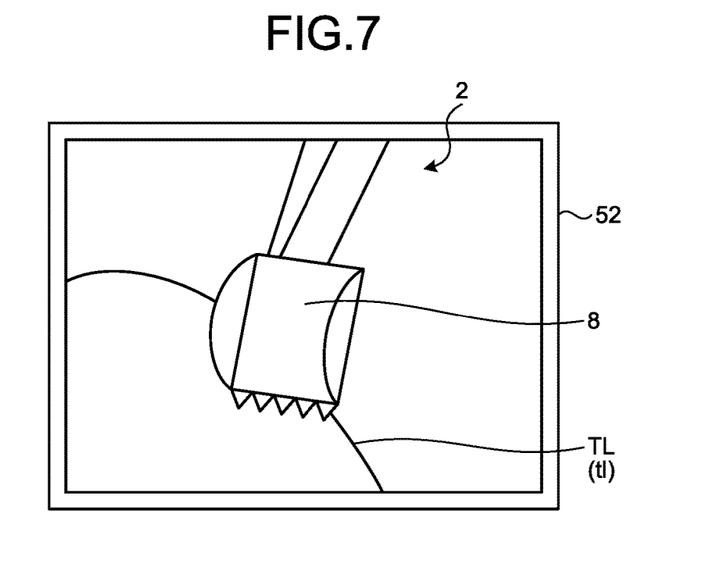
FIG. 7 is another diagram illustrating an example of the state in which the route image and the bucket of the working equipment are superimposed and displayed on the display device.

FIG. 3 is a block diagram illustrating the processor 51P included in the processing device 51 in the image display system 100. FIG. 4 is a diagram illustrating an example of converting a position in the global coordinate system into a position in the imaging device coordinate system. FIG. 5 is an explanatory diagram of processing for determining whether the route tl is shielded by the working equipment 2 in a case where the route image TL is viewed from a predetermined position. FIGS. 6 and 7 are diagrams illustrating an example of the state in which the route image TL and the bucket 8 of the working equipment 2 are superimposed and displayed on the display device 52.

The processor 51P receives vehicle information IFm, and provides the received vehicle information IFm to the position calculator 51C, the route calculator 51R, and the display processor 51D. The display processor 51D includes a viewpoint conversion unit 51DT, a working equipment area calculator 51DM, a route drawing unit 51DR, a shielding operation unit 51DC, and an image composition unit 51DS.

The vehicle information IFm includes the position and the attitude of the hydraulic excavator 1, and the attitude of the working equipment 2 included in the hydraulic excavator 1. A position Pg of the hydraulic excavator 1 is a position of at least one of the position of the antenna 21 and the position of the antenna 22 in the global coordinate system detected by the position calculation device 23. The attitude of the hydraulic excavator 1 is a roll angle $\theta r$, a pitch angle $\theta p$, and a yaw angle $\theta y$ of the hydraulic excavator 1 detected by the second attitude detector 33. The yaw angle may be a bearing angle obtained from, by the position calculation device 23, relative positions of the two antennas 21 and 22.

The attitude of the working equipment 2 is detected by the first stroke sensor 16, the second stroke sensor 17, and the third stroke sensor 18, which are the first attitude detector 32. In the embodiment, the attitude of the working equipment 2 is a boom angle $\theta b$, an arm angle $\theta a$, and a bucket angle $\theta k$.

The vehicle information IFm is transmitted from the sensor controller 26 of the hydraulic excavator 1 to the communication device 54 in the facility 50 via the communication device 25. Upon receipt of the vehicle information IFm, the communication device 54 provides the input/output unit 51IO of the processing device 51 with the vehicle information IFm. The input/output unit 51IO provides the processor 51P with the received vehicle information IFm. The position calculator 51C of the processor 51P, the route calculator 51R, and the viewpoint conversion unit 51DT of the display processor 51D execute processing using the received vehicle information IFm.

The position calculator 51C determines the position of the working equipment 2 using the information regarding the working equipment 2 out of the received vehicle information IFm. The information regarding the working equipment 2 is the boom angle $\theta b$, the arm angle $\theta a$, and the bucket angle $\theta k$ of the working equipment 2. Dimensions of the working equipment 2, that is, for example, a length of the boom 6, a length of the arm 7, and a length from a rotation center to the cutting edge 8T of the bucket 8, are stored in the storage 51M of the processing device 51 in advance as a model of the working equipment 2.

For example, in a case where a position of the cutting edge 8T of the bucket 8 is determined as a position of the working equipment 2, a positional relationship between a base end of the boom 6 on the side of the slewing body 3 and the cutting edge 8T can be determined on the basis of the boom angle $\theta b$, the arm angle $\theta a$, and the bucket angle $\theta k$ of the working equipment 2, and the length of the boom 6, the length of the arm 7, and the length from the rotation center to the cutting edge 8T of the bucket 8. A positional relationship between the position Pg of the hydraulic excavator 1, that is, at least one of the positions of the antenna 21 and the antenna 22 in the embodiment, and the base end of the boom 6 on the side of the slewing body 3 can be determined in advance. Accordingly, the position calculator 51C can determine the position of the cutting edge 8T of the bucket 8 in the global coordinate system on the basis of the position Pg of the hydraulic excavator 1, the information associated with the working equipment 2, the dimension of the working equipment 2, and the bearing of the slewing body 3. The bearing of the slewing body 3 may be determined from those positions obtained by the antennas 21 and 22, or the yaw angle of the slewing body 3 detected by the IMU 33 may be used.

In this manner, the position of the cutting edge 8T of the bucket 8, which is the position of the working equipment 2, can be determined by the position of the working equipment 2 and the attitude of the hydraulic excavator 1, which are, more specifically, the position of the working equipment 2 and the attitude of the slewing body 3. The position of the working equipment 2 can be determined by the dimension of the working equipment 2 and the attitude of the working equipment 2. In the embodiment, the position calculator 51C determines the position of the bucket 8, the arm 7, and the boom 6 included in the working equipment 2 as the position of the working equipment 2. When determining the position of the working equipment 2, the position calculator 51C determines the position of the working equipment 2 using, for example, the model of the working equipment 2 based on information regarding the dimension and shape of the working equipment 2. The dimension and the shape of the working equipment 2 are included in the design information or a model of a computer aided design (CAD) of the working equipment 2.

In the descriptions above, the position calculator 51C determines the cutting edge 8T of the bucket 8 as the position of the working equipment 2. When determining the position other than the cutting edge 8T of the working equipment 2, the position calculator 51C determines a plurality of representative positions capable of grasping an outside shape of the working equipment 2, and the position within the range surrounded by the plurality of representative positions may be set as the position of the working equipment 2. The position of the working equipment 2 includes at least one of the position of the bucket 8, the position of the arm 7, and the position of the boom 6. The position of the cutting edge 8T described above is a part of the position of the bucket 8. In the embodiment, the position calculator 51C determines the position of the bucket 8, the position of the arm 7, and the position of the boom 6 as the position of the working equipment 2.

The position calculator 51C may change the object for determining the position of the working equipment 2 within the working equipment 2 depending on a part of the working equipment 2 occupying the screen of the display device 52, the position of the route tl, a processing load, and the like. For example, in a case where the bucket 8 and a part of the arm 7 appear on the screen of the display device 52, the position calculator 51C may determine the position of the bucket 8 and the position of the arm 7 as the position of the working equipment 2. With this processing, the load of the processing executed by the position calculator 51C is reduced. In a case where the processing load becomes excessive when all positions of the bucket 8, the arm 7, and the boom 6 are determined, the position calculator 51C may determine only the position of the bucket 8 of the working equipment 2 as the position of the working equipment 2. With this processing, the load of the processing executed by the position calculator 51C is reduced, whereby a load on hardware resources of the image display system 100 is reduced.

The route calculator 51R determines the route through which the working equipment 2 moves, that is, the route through which the bucket 8 moves in the embodiment, on the basis of the received vehicle information IFm. As described above, this route is a target route when the working equipment 2 moves. Information regarding a current position and an attitude of the hydraulic excavator 1 is required for determining the route. The route calculator 51R determines the route on the basis of the current position Pg and the attitude of the hydraulic excavator 1 included in the vehicle information IFm. When the route calculator 51R determines the route, the route calculator 51R may use information regarding the surroundings of the hydraulic excavator 1 obtained by the imaging device 19 of the hydraulic excavator 1 or a distance detection device such as a stereo camera and a laser scanner mounted on the hydraulic excavator 1 to determine the route. For example, in a case where the hydraulic excavator 1 loads a load on a dump truck, the route calculator 51R can determine a route in which the working equipment 2 does not interfere with the dump truck. This route is a route in the global coordinate system.

The viewpoint conversion unit 51DT determines a transformation matrix by which the route image TL and the position of the working equipment 2 are converted into an image viewed from a predetermined position, that is, for example, a position corresponding to a visual line of the operator or a position of the imaging device 19. An example of converting a position Pgk (xg, yg, zg) of the working equipment 2 in the global coordinate system (Xg, Yg, Zg) into a position Psk (xs, ys, zs) of the working equipment 2 in the imaging device coordinate system (Xs, Ys, Zs) will be described with reference to FIG. 4.

The viewpoint conversion unit 51DT determines a first transformation matrix Rg for converting the position Pgk (xg, yg, zg) of the working equipment 2 in the global coordinate system into a position Pmk (xm, ym, zm) of the working equipment 2 in the vehicle body coordinate system (Xm, Ym, Zm). The position Pgk of the working equipment 2 in the global coordinate system is converted into the position Pmk of the working equipment 2 in the vehicle body coordinate system by a product of the position Pgk and the first transformation matrix Rg being calculated. The first transformation matrix Rg is a 3×4 matrix including the roll angle θr, the pitch angle θp, and the yaw angle θy of the hydraulic excavator 1, and a translational component between the global coordinate system and the vehicle body coordinate system. The roll angle θr, the pitch angle θp, and the yaw angle θy of the hydraulic excavator 1 are obtained from the vehicle information IFm. The translational component between the global coordinate system and the vehicle body coordinate system can be obtained from the position Pg of the hydraulic excavator 1 included in the vehicle information IFm and the positional relationship between the position Pg of the hydraulic excavator 1 and the vehicle body coordinate system.

Next, the viewpoint conversion unit 51DT determines a second transformation matrix Rm for converting the position Pmk of the working equipment 2 in the vehicle body coordinate system into the position Psk of the working equipment 2 in the imaging device coordinate system. Accordingly, the position Pmk of the working equipment 2 in the vehicle body coordinate system is converted into the position Psk of the working equipment 2 in the imaging device coordinate system by a product of the position Pmk and the second transformation matrix Rm being calculated. The second transformation matrix Rm is a 3×4 matrix including an angle α for expressing a deviation of the imaging device 19 around the Xs axis, an angle β for expressing a deviation of the imaging device 19 around the Ys axis, an angle γ for expressing a deviation of the imaging device 19 around the Zs axis, and the translational component between the vehicle body coordinate system and the imaging device coordinate system. The angles α, β, γ are obtained in advance. The translational component between the vehicle body coordinate system and the imaging device coordinate system is determined in advance from the positional relationship therebetween in the hydraulic excavator 1.

The working equipment area calculator 51DM converts the position Pgk of the working equipment 2 in the global coordinate system into the position Psk in the imaging device coordinate system using the first transformation matrix Rg and the second transformation matrix Rm obtained by the viewpoint conversion unit 51DT. The route drawing unit 51DR converts the route tl or the route image TL in the global coordinate system into the route tl or the route image TL in the imaging device coordinate system using the first transformation matrix Rg and the second transformation matrix Rm obtained by the viewpoint conversion unit 51DT.

As illustrated in FIG. 5, the shielding operation unit 51DC determines the first portion in which the route tl is shielded by the working equipment 2 in the case where the route tl is viewed from a predetermined position, that is, for example, the position of the imaging device 19, on the basis of the route tl or the route image TL corresponding to the route tl of the working equipment 2 and the position Psk of the working equipment 2. In this case, the route tl or the route image TL corresponding to the route tl of the working equipment 2 is the route tl or the route image TL that has been obtained by the route calculator 51R and converted into the imaging device coordinate system using the first transformation matrix Rg and the second transformation matrix Rm. The position Psk of the working equipment 2 is a position that has been obtained by the position calculator 51C and converted into the imaging device coordinate system using the first transformation matrix Rg and the second transformation matrix Rm. The shielding operation unit 51DC generates information for causing the display device 52 to display the route image TL of the first portion in which the route tl is shielded by the working equipment 2 in the form different from the route image TL of the second portion in which the route image tl is not shielded by the working equipment 2.

In a case where the imaging device 19 is at a first position PLa and the route tl and the route image TL are indicated by the solid line, in other words, in a case where the working equipment 2 exists on the side of the imaging device 19 in front of the route tl, the working equipment 2, that is, the first portion tl1 in which the route tl of the bucket 8 or the route image TL corresponding to the route tl is shielded by the bucket 8 in this example, is in the rage from a position a to a position b. Hereinafter, this range is referred to as a range ab as appropriate. The first portion tl1 in which the route tl or the route image TL corresponding to the route tl is shielded by the bucket 8 is a portion in which the route tl or the route image TL is shielded by the bucket 8 when the bucket 8 and the route tl or the route tl are viewed from the position of the imaging device 19, which is the predetermined position. The shielding operation unit 51DC can determine the first portion tl1 in which the route tl is shielded by the working equipment 2 and the second portion tl2 in which the route tl is not shielded by the working equipment 2 using, for example, processing referred to as the Z-buffer or the W-buffer (see "A Subdivision Algorithm for Computer Display of Curved Surfaces", Catmull, E., 1974) in the computer graphics technology.

The shielding operation unit 51DC of the display processor 51D causes the display device 52 to display the route image TL existing in the range ab in a form different from the route image TL outside the range ab. For example, the shielding operation unit 51DC may display the route image TL within the range ab in a transparent or translucent manner and display the route image TL outside the range ab with some color, display the route image TL such that the color of the route image TL within the range ab is different from the color of the route image TL outside the range ab, or display the route image TL such that the line type of the route image TL within the range ab is different from the line type of the route image TL outside the range ab. The line type includes a line thickness. Displaying the route image TL within the range ab in the transparent manner indicates that an image of the working equipment 2 in a form different from the route image TL outside the range ab is displayed in the portion of the route image TL within the range ab. In the embodiment, when the route image TL within the range ab is displayed in the transparent manner, an image of the bucket 8 is displayed at the portion of the route image TL within the range ab.

When the imaging device 19 is at the first position PLa and the route tl and the route image TL are indicated by the dot-and-dash line, in other words, when the route tl exists between the working equipment 2 and the imaging device 19, there is no portion in which the route tl of the bucket 8 or the route image TL corresponding to the route tl is shielded by the bucket 8. That is, when the bucket 8 and the route tl or the route tl are viewed from the position of the imaging device 19, which is the predetermined position, there is no portion in which the route tl or the route image TL is shielded by the bucket 8. In this case, the shielding operation unit 51DC causes the display device 52 to display all the route images TL in the same form.

When the imaging device 19 is at the second position PLb and the route tl and the route image TL are indicated by the solid line, the first portion tl1 in which the route tl of the bucket 8 or the route image TL corresponding to the route tl is shielded by the bucket 8 is in the range from a position c to a position d. Hereinafter, this range is referred to as a range cd as appropriate. The outside of the range cd is the second portion tl2 in which the route tl of the bucket 8 or the route image TL corresponding to the route tl is not shielded by the bucket 8. When the position of the imaging device 19, which is the predetermined position, changes, the portion in which the route tl or the route image TL corresponding to the route tl is shielded by the bucket 8 differs.

For example, the operator actually boarding on the hydraulic excavator 1 may wear a head mount display, and the route image TL may be displayed on the head mount display. In this case, when the operator performs an action such as moving his/her head so that the viewpoint position of the operator changes, the position of the head mount display also changes. When the viewpoint position of the operator, in other words, the position of the head mount display changes, the shielding operation unit 51DC may determine the portion in which the route tl is shielded by the working equipment 2 on the basis of the changed position.

The image composition unit 51DS combines the route image TL obtained by the shielding operation unit 51DC and the image of the working equipment 2 captured by the imaging device 19, and causes the display device 52 to display the composite image. The route image TL is a three-dimensional image, whereas the route image TL displayed on the display device 52 is a two-dimensional image. In addition, the image of the working equipment 2 captured by the imaging device 19 is also a two-dimensional image. Therefore, the image composition unit 51DS executes perspective projection transformation for projecting the route image TL defined in the three-dimensional space, that is, in the imaging device coordinate system, on the two-dimensional plane, and combines the transformed route image TL and the image of the working equipment 2 captured by the imaging device 19 to cause the display device 52 to display the composite image.

When the route image TL and the image of the working equipment 2 captured by the imaging device 19 are combined, as illustrated in FIGS. 6 and 7, the route image TL and the working equipment 2, that is, the bucket 8 in this example, are superimposed and displayed on the display device 52. FIG. 6 illustrates a state in which the bucket 8 exists at the back of the route tl when viewed from the position corresponding to the viewpoint of the operator or the position of the imaging device 19. In this case, since the route tl has no portion shielded by the bucket 8, the route image TL does not include a portion to be displayed in a different form. FIG. 7 illustrates an exemplary case where the bucket 8 exists in front of the route tl and the portion of the route tl shielded by the bucket 8 is displayed in the transparent manner. In this example, the image of the bucket 8 in a form different from the portion in which the route tl is not shielded by the bucket 8 is displayed at the portion in which the route tl is shielded by the bucket 8. In this manner, the image display system 100, that is, more specifically, the processing device 51, can inform the operator of the information regarding whether the working equipment 2 is located on the imaging device 19 side or the back side than the route tl, whereby a decrease in work efficiency in the remote control can be suppressed.

<Method for Displaying Image of Work Machine>

Figure 8:
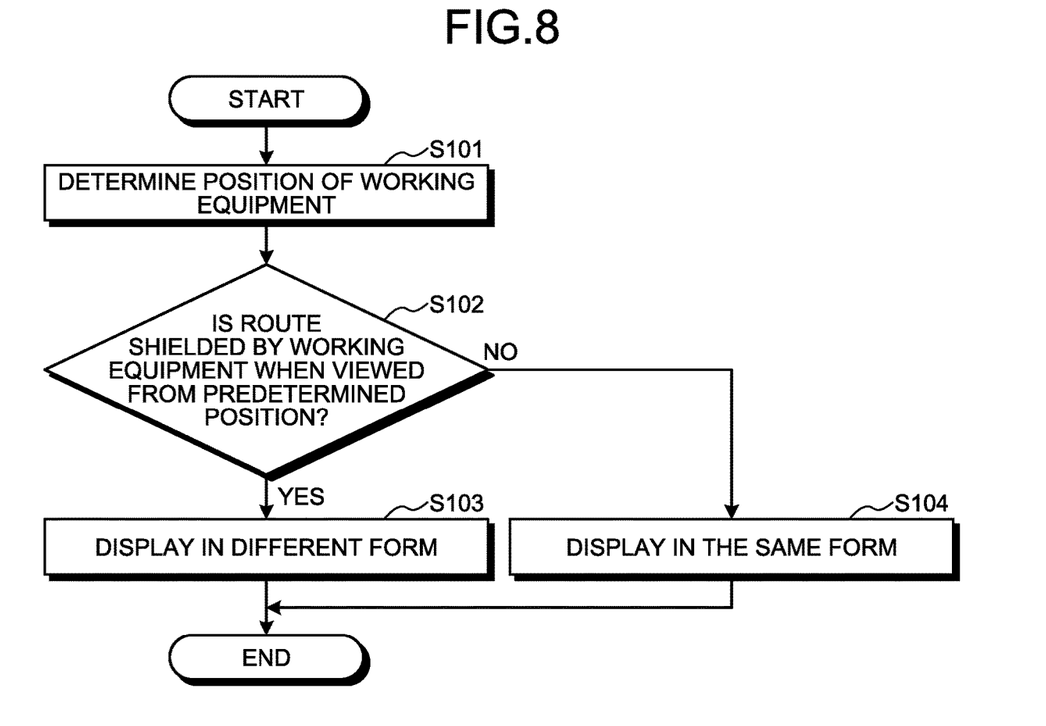
FIG. 8 is a flowchart illustrating a procedure of a method for displaying an image of the work machine according to the embodiment.

FIG. 8 is a flowchart illustrating a procedure of a method for displaying the image of the work machine according to the embodiment. The method for displaying the image of the work machine is achieved by the image display system 100. In step S101, the position calculator 51C of the processing device 51 determines the position of the working equipment 2. In step S102, the display processor 51D of the processing device 51 determines whether the route tl is shielded by the working equipment 2 when viewed from a predetermined position. When the route tl is shielded by the working equipment 2 (Yes in step S102), the display processor 51D causes the display device 52 to display the route image TL of the shielded portion in a form different from the route image TL of the unshielded portion in step S103. When the route tl is not shielded by the working equipment 2 (No in step S102), the display processor 51D causes the display device 52 to display all the route images TL in the same form in step S104.

<Variation of Embodiment>

Figure 9:
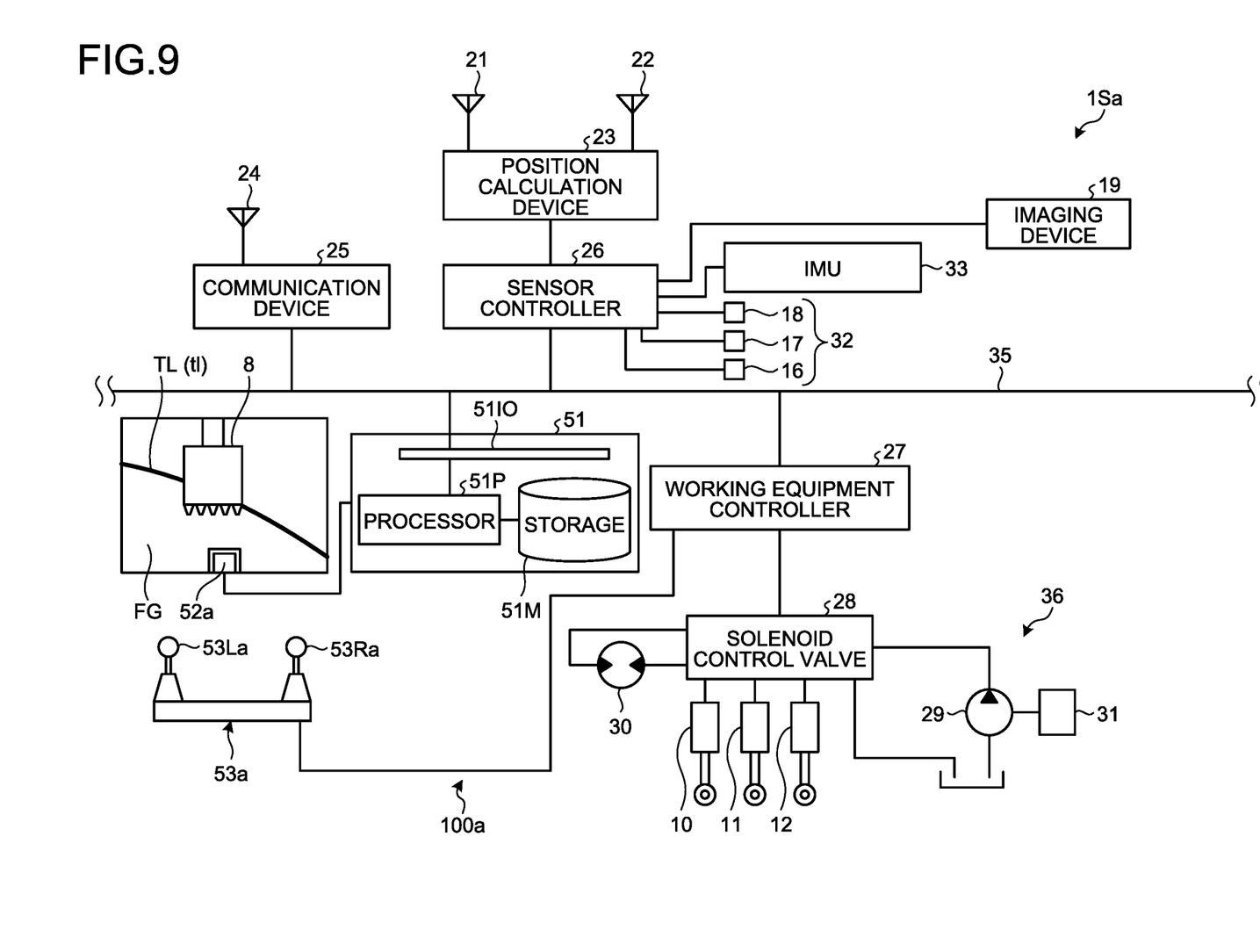
FIG. 9 is a diagram illustrating a control system of a hydraulic excavator according to a variation of the embodiment.

FIG. 9 is a diagram illustrating a control system 1Sa of a hydraulic excavator 1 according to a variation of the embodiment. The image display system 100 and the remote operation system 101 described above remotely operate the hydraulic excavator 1 using an operation device 53 in a facility 50 illustrated in FIG. 1. In the variation, a display device 52a is provided in a cab 4 of the hydraulic excavator 1, and a route image TL is displayed on the display device 52a to assist operation of an operator of the hydraulic excavator 1.

In the control system 1Sa, a processing device 51 is connected to a signal line 35 in the control system 1S described above. Further, in the control system 1Sa, an operation device 53a is connected to the signal line 35 in the control system 1S described above via a working equipment controller 17. The display device 52a is connected to the processing device 51. The processing device 51 included in the control system 1Sa has a function similar to that of the processing device 51 provided in the facility 50, which is illustrated in FIG. 1, in the image display system 100 and the remote operation system 101 described above. An image display system 100a according to the variation includes the processing device 51 and the display device 52a.

The display device 52a in the control system 1Sa is a head-up display that projects an image onto a front window FG of a driver seat. The display device 52a displays the route image TL at a position matching a bucket 8 seen through the front window FG. The display device 52a is not limited to the head-up display, and may be a normal display.

The operation device 53a is a device for operating the hydraulic excavator 1, which includes a left operation lever 53La and a right operation lever 53Ra. The operation device 53a may be a pilot hydraulic type or an electric type.

In the hydraulic excavator 1 having the control system 1Sa, the route image TL of a case where a route tl is viewed from a predetermined position, that is, for example, a position corresponding to a viewpoint of the operator seated in the driver seat, is displayed on the front window FG by the image display system 100a. Through such processing, the image display system 100a can inform the operator operating the hydraulic excavator 1 of information whether working equipment 2 is located on the operator side or the back side of the route tl using the route image TL displayed on the front window FG. As a result, the image display system 100a can suppress a decrease in work efficiency. The more the bucket 8 moves away from a vehicle body 1B of the hydraulic excavator 1, the harder it becomes for the operator to perceive a sense of perspective. In such a case, the image display system 100a is effective for suppressing the decrease in work efficiency.

Moreover, with the use of the hydraulic excavator 1 having the image display system 100a, an inexperienced operator can also easily perceive a sense of perspective of the bucket 8. As a result, a decrease in work efficiency and work accuracy is suppressed. Furthermore, even in a situation where it is difficult for the operator to visually observe an actual work object WA such as night-time operation, the operator can work while viewing the route image TL displayed on the display device 52a, whereby the decrease in work efficiency is suppressed.

In the variation of the embodiment, the image display systems 100 and 100a determines a first portion in which the route tl is shielded by the working equipment 2 when the route tl is viewed from the predetermined position, and causes the display devices 52 and 52a to display the route image TL corresponding to a first portion in a form different from the route image TL corresponding to a second portion in which the route tl is not shielded by the working equipment 2. Through such processing, in the image display systems 100 and 100a, the decrease in work efficiency is suppressed when working with a work machine including the working equipment 2.

In the embodiment and the variation, the image display systems 100 and 100a may causes the display devices 52 and 52a to display a distance between the route image TL and the working equipment 2 in addition to the route image TL. Further, in the image display systems 100 and 100a, the processing device 51 may change a display form of the route image TL depending on a distance between the working equipment 2 and the route tl. For example, the processing device 51 may change a color of the route image TL as the distance between the working equipment 2 and the route tl increases, increase luminance of the route image TL as the distance between the working equipment 2 and the route tl increases, or enlarge the route image TL as the distance between the working equipment 2 and the route tl increases.

In the embodiment or the variation, a position calculator 51C determines a plurality of representative positions capable of grasping an outside shape of the working equipment 2 as a position of the working equipment 2. In addition to that, the position calculator 51C may determine a position of a plane corresponding to an opening of the bucket 8 as the position of the working equipment 2, and may use the position for processing for determining whether the route tl is shielded by the working equipment 2 and for changing the display form of the route image TL. The position of the working equipment 2 is not limited to those exemplified in the embodiment and the variation.

A work implement may be other than the bucket 8. For example, a grasper for gripping an object may serve as the work implement. In the case where the grasper is the work implement, the position calculator 51C may determine whether the route tl is shielded by the work implement or an object gripped by the work implement. In this case, for example, a distance detection device such as a stereo camera and a laser scanner is attached to the hydraulic excavator 1, and a position of the object gripped by the work implement is detected by the distance detection device. The position calculator 51C determines the position of the object gripped by the work implement from the position information detected by the distance detection device. For example, the position calculator 51C determines, from the position information detected by the distance detection device, a position of a portion in which a distance from an imaging device 19 is within a predetermined range as the position of the object gripped by the work implement with a position of the gripping portion of the work implement serving as a center. Through such processing, the position calculator 51C obtains the position of the work implement and the object gripped by the work implement, and determines whether the route tl is shielded by the work implement and the object gripped by the work implement on the basis of the obtained position.

In a case where the work implement is the bucket 8 as well, the position calculator 51C can determine a position of a portion swollen from the opening of the bucket 8 as a position of an object loaded on the bucket 8 through processing similar to the processing for determining the position of the object gripped by the work implement. The position calculator 51C may obtain the position of the object loaded on the bucket 8 and determine whether the route tl is shielded by the bucket 8 and the object loaded on the bucket 8 on the basis of the obtained position. Through such processing, the image display systems 100 and 100a can cause the display devices 52 and 52a to display more practical images.

The processing device 51 may detect an attitude of the working equipment 2 and a first operation of the operation devices 53 and 53a made by the operator, cause the display devices 52 and 52a to display the route image TL, and erase the display of the route image TL when a second operation of the operation devices 53 and 53a is detected. Through such processing, the route image TL is erased when guidance using the route image TL is unnecessary, thereby improving visibility of the operator. The first operation is exemplified by, for example, an operation of swinging a slewing body 3 while holding the bucket 8 at a low position. The second operation is exemplified by, for example, a dump operation (soil discharge operation) for discharging a load of the bucket 8.

Although the embodiment and the variation have been described above, the embodiment and the variation are not limited by the contents described above. The constituent elements described above include those that can be easily assumed by a person skilled in the art, those that are substantially the same, and what is called equivalents. The constituent elements described above may be combined as appropriate. At least one of various omissions, substitutions, and modifications of the constituent elements may be made without departing from the spirit of the embodiment and the variation. The work machine is not limited to the hydraulic excavator 1, and may be another work machine including the working equipment such as a wheel loader and a bulldozer.

REFERENCE SIGNS LIST

1 HYDRAULIC EXCAVATOR
1B VEHICLE BODY
1S, 1Sa CONTROL SYSTEM
2 WORKING EQUIPMENT
3 SLEWING BODY
5 TRAVELING BODY
16 FIRST STROKE SENSOR
17 SECOND STROKE SENSOR
18 THIRD STROKE SENSOR
19 IMAGING DEVICE
19L IMAGING SURFACE
21, 22 ANTENNA
23 POSITION CALCULATION DEVICE
25 COMMUNICATION DEVICE
26 SENSOR CONTROLLER
27 WORKING EQUIPMENT CONTROLLER
32 FIRST ATTITUDE DETECTOR
33 SECOND ATTITUDE DETECTOR
36 HYDRAULIC SYSTEM
50 FACILITY
51 PROCESSING DEVICE
51C POSITION CALCULATOR
51D DISPLAY PROCESSOR
51DC SHIELDING OPERATION UNIT
51DM WORKING EQUIPMENT AREA CALCULATOR
51DR ROUTE DRAWING UNIT
51DS IMAGE COMPOSITION UNIT
51DT VIEWPOINT CONVERSION UNIT
51IO INPUT/OUTPUT UNIT
51M STORAGE
51P PROCESSOR
51R ROUTE CALCULATOR
52, 52a DISPLAY DEVICE
53, 53a OPERATION DEVICE
100, 100A IMAGE DISPLAY SYSTEM
101 REMOTE OPERATION SYSTEM
FG FRONT WINDOW
IFm VEHICLE INFORMATION
Rg FIRST TRANSFORMATION MATRIX
Rm SECOND TRANSFORMATION MATRIX
TL ROUTE IMAGE

The invention claimed is:

1. An image display system of a work machine having working equipment, comprising:
an imaging device provided to a body of the work machine and facing a front of the work machine, the imaging device imaging the working equipment and a working object;
a position calculator that determines a position of the working equipment;
a display that displays a route image corresponding to a route through which the working equipment moves or a route through which the working equipment will move as a movement guide;
a display processor which is capable of both displaying the route image superimposed on the working equipment and displaying, on the basis of a position of the route and a position of the working equipment determined by the position calculator, without causing the display to display the route image corresponding to a portion of the route that is shielded by the working equipment with a predetermined position serving as a viewpoint, the route image corresponding to a portion of the route that is not shielded by the working equipment, wherein the predetermined position is a visual line of the imaging device,
wherein the display processor is configured to determine a transformation matrix by which a route image and the position of the working equipment are converted into an image viewed from the predetermined position; and
wherein the display processor configured to execute perspective projection transformation for projecting the route image defined in a three-dimensional space, that is, in the imaging device coordinate system, on a two-dimensional plane, and combines a transformed route image and an image of the working equipment captured by the imaging device to cause the display to display the composite image.

2. The image display system of a work machine according to claim 1, wherein
the display processor converts the route image into an image viewed from the predetermined position and causes the display to display the converted image.

3. The image display system of a work machine according to claim 1, wherein the predetermined position is a position of the imaging device that is attached to the work machine and images the object.

4. The image display system of a work machine according to claim 1, wherein
the display processor changes a display form of the route image depending on a distance between the working equipment and the route.

5. A remote operation system of a work machine, comprising:
the image display system of a work machine according to claim 1; and
an operation device that operates the working equipment.

6. A work machine, comprising: the image display system of a work machine according to claim 1.

7. A method for displaying an image of a work machine having working equipment, comprising:
imaging the working equipment and a working object with an imaging device provided to a body of the work machine and facing a front of the work machine;
determining a position of the working equipment of the work machine;
determining, on the basis of a position of a route through which the working equipment moves or a route through which the working equipment will move as a movement guide and a position of the working equipment, whether the working equipment shields the route with a predetermined position serving as a viewpoint, wherein the predetermined position is a visual line of the imaging device;
causing a display to display both the route image superimposed on the working equipment and without causing the display to display a route image corresponding to a portion of the route that is shielded by the working equipment, the route image corresponding to a portion of the route that is not shielded by the working equipment;

determining a transformation matrix by which a route image and the position of the working equipment are converted into an image viewed from the predetermined position; and executing a perspective projection transformation for projecting the route image defined in a three-dimensional space, that is, in the imaging device coordinate system, on a two-dimensional plane, and combines a transformed route image and an image of the working equipment captured by the imaging device to cause the display to display the composite image.

8. The image display system of a work machine according to claim 1, wherein the display displays a distance between the route image and the working equipment in addition to the route image.

9. The image display system of a work machine according to claim 1, wherein the display processor causes the display to display the route image corresponding to the portion of the route that is shielded by the working equipment and an object loaded on the working equipment with a predetermined position serving as a viewpoint in a form different from the route image corresponding to a portion of the route that is not shielded by the working equipment and the object loaded on the working equipment.

10. The image display system of a work machine according to claim 1, wherein the display processor causes the display to display the route image during a first operation and erase the display of the route image during a second operation different from the first when guidance using the route image is unnecessary, thereby improving visibility of the operator.

11. The image display system of the work machine according to claim 1, further comprising:
wherein the display processor is configured to generate information for causing the display to display the route image of the first portion in which the route is shielded by the working equipment in the form different from the route image of the second portion in which the route image is not shielded by the working equipment.

12. The image display system of the work machine according to claim 1, further comprising:
a head mount display for the operator for displaying the route image, whereby when the operator performs an action such as moving his/her head so that a viewpoint position of the operator changes, the position of the head mount display also changes.

13. The image display system of the work machine according to claim 1, further comprising:
a head-up display that projects an image onto a front window of a driver seat;
wherein the display displays the route image at a position matching the working equipment seen through the front window.

14. The image display system of the work machine according to claim 1, wherein the work machine includes a slewing body, and the route corresponding to a swing of the slewing body.

15. The method for displaying an image of a work machine according to claim 7, further comprising displaying a distance between the route image and the working equipment in addition to the route image.

16. The method for displaying an image of a work machine according to claim 7, further comprising displaying the route image corresponding to the portion of the route that is shielded by the working equipment and an object loaded on the working equipment with a predetermined position serving as a viewpoint in a form different from the route image corresponding to a portion of the route that is not shielded by the working equipment and the object loaded on the working equipment.

17. The method for displaying an image of a work machine according to claim 7, further comprising displaying the route image during a first operation and erasing the display of the route image during a second operation different from the first operation when guidance using the route image is unnecessary, thereby improving visibility of the operator.

18. The method for displaying an image of a work machine according to claim 7, further comprising:
generating information for causing the display to display the route image of the first portion in which the route is shielded by the working equipment in the form different from the route image of the second portion in which the route image is not shielded by the working equipment.

19. The image display system of a work machine according to claim 10, wherein the processor is configured to detect an attitude of the working equipment and display the route image upon detection of the first operation made by the operator and erase the display of the route image upon detection of the second operation made by the operator, wherein the first operation includes swinging a slewing body of the work machine while holding a bucket at a low position, and wherein the second operation includes a dump operation for discharging a load of the bucket.

* * * * *